June 22, 1937.  B. S. AIKMAN  2,084,371
MOTOR VEHICLE CONTROL SYSTEM
Filed May 28, 1932  2 Sheets-Sheet 1

Inventor.
Burton S. Aikman
By ... Jackson ...
Attys.

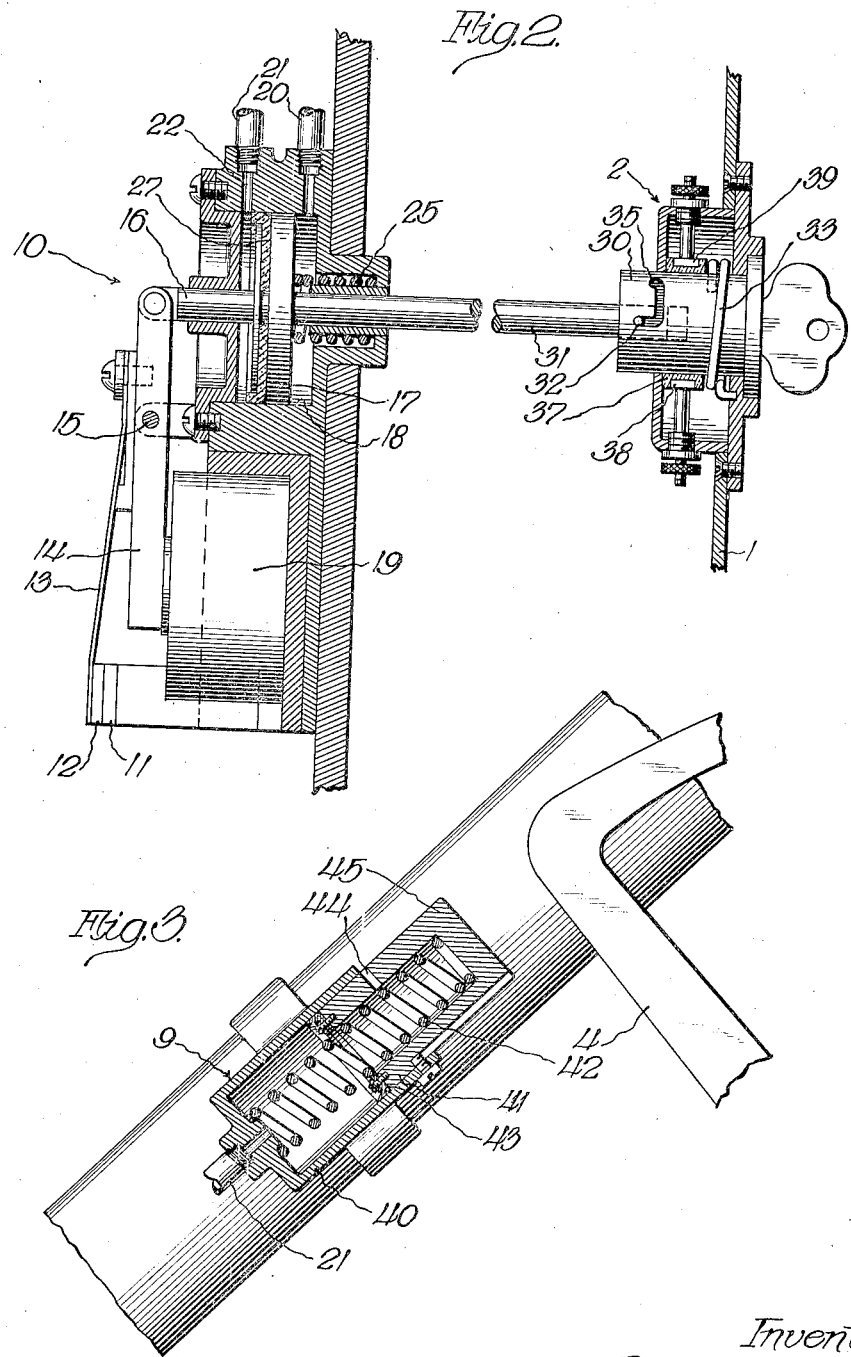

Patented June 22, 1937

2,084,371

UNITED STATES PATENT OFFICE 2,084,371

MOTOR VEHICLE CONTROL SYSTEM

Burton S. Aikman, Milwaukee, Wis., assignor of one-half to John A. Dienner, Evanston, Ill.

Application May 28, 1932, Serial No. 614,093

25 Claims. (Cl. 290—38)

The present invention relates to means for controlling automobiles and is intended to minimize the duties of the driver in a simple and expedient manner.

It is one of the objects of the present invention to provide an arrangement wherein the switch that controls the engine cranking motor is automatically closed if the engine should stall during the normal operation of the automobile, and to provide for automatically opening the starting switch when the engine has started.

It is a further object of the present invention to provide an arrangement wherein the initial actuation of the clutch pedal that declutches the driving connection between the engine and the wheels also unlocks the cranking motor starting switch to permit energization of the cranking motor. By this arrangement there is a positive assurance that an operator will not inadvertently crank the engine while the clutch is engaged, thereby placing a very great load upon the starting motor.

It is another object of the present invention to provide an arrangement wherein the starting motor switch is locked in its open position when the ignition is turned off. This prevents the cranking of the engine when the ignition is locked.

It is another object of the present invention to provide an arrangement wherein the control of the bright and dim headlights may be transferred to the ignition switch so that the bright lights will be automatically turned off and the dim or parking lights turned on when the ignition switch is actuated to turn off the ignition.

The attainment of the above and further objects of the present invention will be apparent from the following specifications taken in conjunction with the accompanying drawings forming a part thereof.

In the drawings:

Figure 2 is an enlarged sectional view showing my improved starting switch and the manner whereby it is locked to the ignition switch;

Figure 3 is an enlarged sectional view of the pedal controlled means for releasing the starting switch;

Figure 1:
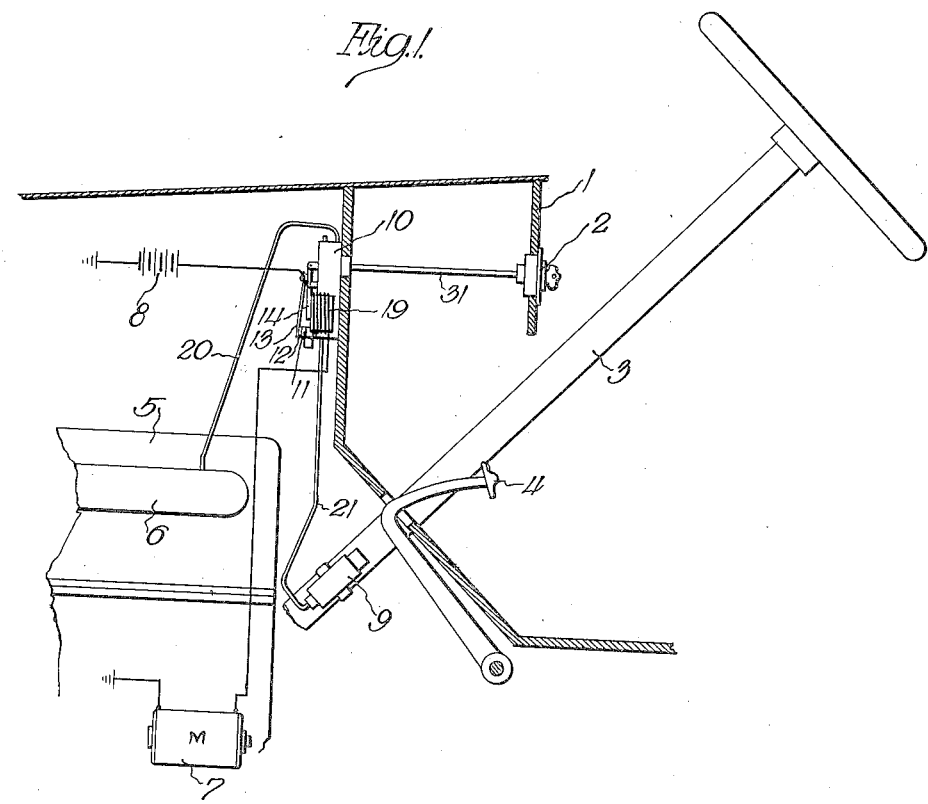
Figure 1 is a fragmentary view showing a portion of an automobile with my invention applied thereto.

Reference may now be had more particularly to Figure 1. At 1 I have indicated the dashboard of an automobile, said dashboard carrying the usual key control ignition switch 2. The automobile steering column is indicated at 3, and the clutch control pedal at 4. The automobile internal combustion engine is indicated diagrammatically at 5, the intake manifold thereof at 6, the cranking motor at 7, and the usual battery at 8. This is intended as a diagrammatic illustration of the conventional type of automobile.

An automatic starting switch, of my improved construction, is indicated in general by the reference numeral 10. The switch is shown more particularly in Figure 2 and comprises a stationary contact 11, a movable contact 12 carried by a spring conductor 13 that is mounted upon an armature 14 which is pivoted at 15. One end of the armature 14 is connected by means of a rod 16 to a piston 17 that moves within a cylinder 18. The opposite end of the armature cooperates with the core of an electromagnet 19. The portion of the cylinder on one side of the piston is adapted to be connected to the intake manifold of the engine by means of a pipe 20. The other side of the piston 17 is adapted to have pressure applied thereto by means of a pipe 21 that communicates through a passageway 22 with the end of the cylinder. The pipe 21 is connected to a pressure device that is mounted upon the steering column of the automomile, as will be more fully set forth as this description proceeds. The piston 17 is biased to the position shown in Figure 2, that is the switch closed position, by means of a spring 25 and is adapted to be moved in the opposite direction either by suction applied from the intake manifold through the pipe 20, or by pressure applied to the opposite side of the piston through the pipe 21. The piston 17 carries a leather cup 27 at one end, and at the other end is connected to the outer tumbler 30 of the key controlled ignition switch 2 by means of a rod 31 and a pin 32 in the end of the rod. The pin 32 rides in a slot in the tumbler 30, said tumbler being indicated in Figure 2 in the position that it is when the ignition switch is in its unlocked position with the ignition "on". A torsion spring 33 is provided for turning the tumbler 30 when the same is unlocked by its key and freed to rotate. When the ignition switch is in its locked position the piston 17 is in its retracted position with the tumbler 30 rotated so that the pin 32 lies in the projecting portion 35 of the slot. The tumbler 30 carries, on its outer side, a suitable strip of insulation 37 in which are mounted conducting segments 38 and 39 that cooperate with suitable terminals for effecting the necessary switching operation.

The release device 9 which is mounted upon the steering column 3 comprises a cylinder 40 within which moves a piston 41 having at its inner end a leather cup 43, said piston being biased to its outward position by a spring 42.

The piston is provided with a vent 44 for maintaining atmospheric pressure within the cylinder 40 when the piston is in its outward position. The outwardly extending portion 45 of the piston is adapted to be engaged by the clutch pedal 4 as the clutch pedal moves downward beyond its clutch disengaging position. The normal position of the clutch pedal is somewhat above the portion 45 of the release member so that as the clutch pedal is depressed it first releases the clutch and upon continued movement thereof depresses the piston 41.

An explanation will now be given of the manner of operation of the mechanism thus far described. Assume that the engine is at rest and that the starting switch 10 is open, with the piston 17 thereof drawn back against the tension of the spring 25 and locked against outward movement by engagement of the pin 32 within the detent 35 of the tumbler 30. The operator turns the key of the ignition switch to its "on" position. The outer tumbler 30 of the ignition switch 2 is thus unlocked as far as concerns the action of the ignition key, but due to the fact that the pin 32 is at this time in the detent 35 and is being urged outwardly by the spring 25 the tumbler 30 cannot move to its "on" or "running" position under the action of the torsion spring 33. When the clutch pedal 4 is depressed pressure is applied by the release pedal forcing the piston 41 of the release device 3 into its cylinder. This pressure is transmitted through the pipe 21 to the outer side of the piston 17 thus forcing the piston 17 inward a slight amount against the action of the spring 25. The pin 32 on the rod 31 now clears the detent 35 and permits the tumbler 30 to be turned by the torsion spring 33. When the tumbler reaches the position shown in Figure 2 it releases the rod 31 so that the piston 17 may be moved by the spring 25 to the position shown in Figure 2. At this time the ignition is "on". Upon a slight release of the pedal 4 the piston 17 is moved outwardly by the spring 25 thereby moving the armature 14 against the core of the magnet 19 and at the same time closing the contacts 11—12. This completes a circuit for the starting motor 7 (Figure 1) thereby causing this motor to operate to crank the engine. The coil of the magnet 19 is connected in series with the starting motor. The motor takes a very heavy current upon starting and therefore the armature 14 is normally attracted to the core of the magnet 19 and produces a firm contact pressure between the movable contacts 12 and the stationary contact 11. When the engine fires its speed is appreciably increased and at the same time the current taken by the motor 7 drops to a low value. The suction from the intake manifold, applied through the pipe 20 to the inner side of the piston 17, draws the piston back against the action of the spring 25 and against the pull of the electromagnet 19. Thereafter during the normal operation of the automobile the piston 17 is maintained in its retracted position by the suction from the intake manifold. The area of the piston 17 is such that the degree of vacuum required to overcome the spring 25 is quite small so that, should the engine stall, it will be almost at rest before the piston 17 is released. In case of accidental stoppage of the engine during the operation of the automobile the spring 25 will automatically cause a reclosure of the switch 10 after a momentary delay due to the action of the leather cup 27. This establishes the starting circuit for the cranking motor 7 whereby the engine is immediately restarted. This is of particular importance in connection with the so-called "free-wheeling" transmission. Such transmissions usually employ some sort of automatic arrangement for permitting the declutching of the engine to permit the car to travel under its own inertia at a speed faster than that of the engine. During such time the engine idles and any stoppage of the engine may go unnoticed by the driver. After the car has decelerated sufficiently and the driver wishes to stop the deceleration, or to accelerate the car, he may find, in the usual prior practice, that the engine has died. The operator is then required to first step on the starter pedal to start the engine. Such manipulation necessarily involves some delay which, under some traffic conditions, may be seriously objectionable. By the present invention the engine is automatically restarted in the event that it should stop during the normal operation of the automobile while the ignition switch is in its "on" position. As previously stated, the leather cup 27 produces a dash-pot action slowing down the movement of the piston 17, so that there is a slight delay after the vacuum is lost at the conduit 20 before the piston 17 reaches the position where it causes closure of the contacts 11—12. During this interval the engine is stopping, so that when the starting motor is energized the engine will be at rest, or substantially at rest. This is due to the fact that in the usual automobile type internal combustion engine the suction at the intake manifold continues until the engine is substantially at rest, and the complete stoppage of the engine results very shortly after the loss of suction at the intake manifold.

During normal running conditions of the engine the pin 32 at the end of the rod 31 is in a position to permit turning of the tumbler 30. Hence, to stop the car, it is merely necessary to turn the ignition switch 2, thereby turning the tumbler 30 to bring the detent 35 opposite the pin 32. The ignition system is now turned "off" and the engine stops. The suction on the intake manifold is now released and therefore the spring 25 tends to move the piston 17 outwardly. The pin 32 then engages in the detent 35 and thereby locks the starting switch open.

Figure 4:
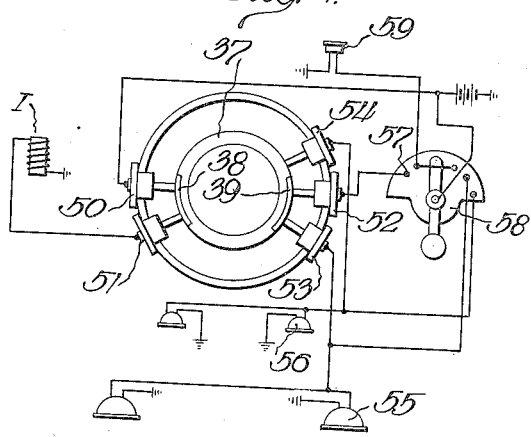
Figure 4 is a fragmentary circuit diagram of the electric lighting and ignition connections at the ignition switch.

In Figure 4 I have shown a simplified circuit diagram of the circuit controlled by the ignition switch 2. The switch is shown in its normal running position. The strip of insulation 37 carries the conducting segments 38 and 39 as previously set forth. When the ignition switch is in its "on" position the conducting segment 38 establishes a circuit from the battery terminal 50 of the switch to a terminal 51 thereof that is connected to the ignition coil 1 for controlling the ignition system of the automobile. When the ignition switch is in its "on" position the conducting segment 39 establishes a circuit between a terminal 52 and another terminal 53 of the switch whereas when the switch is in its "off" position this segment establishes a circuit between the terminal 52 and the terminal 54. The terminal 53 is connected to the head lights 55 of the automobile whereas the terminal 54 is connected to the parking lights 56 of the automobile. The terminal 52 is connected to a terminal 57 of a hand switch 58. When the hand switch is turned in one direction it can control the lamps 55 and 56 directly, as well as a tail lamp 59. When the hand switch 58 is turned the opposite direction it places battery potential upon the terminal 52 of the ignition switch thereby placing the control of the lamps 55—56 under the action of the ignition switch. Under such conditions the head lamps 55 are on as long as the ignition is on and the parking lamps 56 are automatically turned on when the ignition is turned off. The switch 58 may be mounted upon the dashboard or upon the steering wheel of the automobile.

Figure 5:
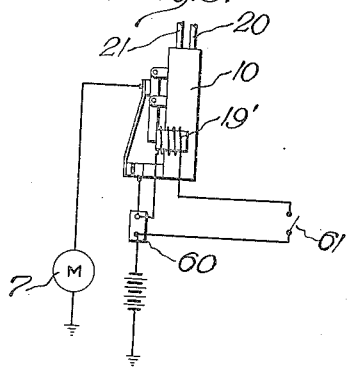
Figure 5 is a fragmentary diagrammatic view illustrating a modification of the invention shown in Figure 1.

In Figure 5 I have shown a modified circuit arrangement for the switch 10. In this arrangement the electromagnet 19′, which corresponds to the electromagnet 19 of Figures 1 and 2, is connected across a shunt 60 that is in series with the starting motor circuit. By this arrangement it is possible to provide a series switch 61 for manually opening the circuit of the coil 19′. The switch 61 may be mounted upon the steering column, the dashboard, or in any other convenient position. If desired, this switch may be incorporated into the ignition switch so that the contacts of the switch 61 may be opened independent of manipulation of the ignition switch. The provision of this switch facilitates the forceful opening of the contacts 11—12 of the starting switch by depressing the clutch pedal 4 to force the piston 17 of the switch 10 back against the action of the spring 25 in the event that the starting action is instituted and the engine does not start, as due to a failure of the ignition system or due to a lack of gasoline or the like.

In compliance with the requirements of the patent statutes I have herein shown and described a preferred embodiment of my invention. It is however to be understood that the invention is not limited to the precise arrangement herein shown, the same being merely illustrative of the principles of the invention. What I consider new and desire to secure by Letters Patent is:

1. In combination with an internal combustion engine having an ignition system, an engine starting motor, a starting switch for controlling the motor, said switch being biased to its closed position, means responsive to the operation of the engine for maintaining the switch open, and manual means for holding the switch open comprising an ignition switch controlling the ignition system of the engine.

2. In combination with an internal combustion engine of an automobile, a starting motor therefor, a starting switch for controlling the motor, said switch being biased to closed position, an ignition switch for controlling the engine, means for locking the ignition switch against closure and a mechanical connection between the two switches for locking the starting switch against closure when the ignition switch is locked.

3. In combination with an internal combustion engine of an automobile, a starting motor therefor, a starting switch for controlling the motor, said switch being biased to closed position, an ignition switch for controlling the engine, a mechanical connection between the two switches for locking the starting switch when the ignition switch is locked, said mechanical connection including means normally preventing the closing of the starting switch even after unlocking of the ignition switch, a lever for declutching the engine from its load, and means controlled by said lever for disabling said preventing means.

4. In combination with an internal combustion engine of an automobile, a starting motor therefor, and a starting switch for the motor, said starting switch including spring means biasing the same to the switch closed position, an electromagnetic coil in series relation with the switch contacts for pressing the switch contacts closed during the rush of starting current to the motor, and a piston actuated from the intake manifold of the engine for urging the switch to its open position.

5. In combination with an internal combustion engine of an automobile, a starting motor therefor, and a starting switch for the motor, said starting switch including springs means biasing the same to the switch closed position, an electromagnetic coil in series relation with the switch contacts for pressing the switch contacts closed during the rush of starting current to the motor, a piston actuated from the intake manifold of the engine for urging the switch to its open position, and additional means external of the switch for actuating the same to its open position.

6. In a system of the class described for use with an internal combustion engine, a starter for the engine, a starter control device biased to assume a controlling position for causing the starter to start the engine, means for restraining said control device from assuming said control position, manually operated means for releasing said restraining means, and a lamp circuit having a controller governed by the position of said restraining means.

7. In combination for use with an internal combustion engine, a starter for the engine, a switch contact for the starter, a spring tending to close said switch contact, an electro-magnetic coil serially related to said contact for holding the same closed, and fluid pressure means for opening said switch against the action of said spring and said coil, said means being energized upon operation of the engine under its own power.

8. In an engine starting system, a starter, a controlling switch therefor, means tending to close said switch, an ignition controller which in its "off" position restrains the starter switch closing means, said means preventing movement of the ignition controller to "on" position, and a manually operable device for releasing said means from the action of the controller.

9. In an engine starting system, a starter, a controlling switch therefor, means tending to close said switch, an ignition controller which in its "off" position restrains the starter switch closing means, said means preventing movement of the ignition controller to "on" position, a manually operable device for releasing said means from the action of the controller, and means tending to throw said ignition controller to "on" position when it is released from said means.

10. In an engine starting system, a starter, a controlling switch therefor, means tending to close said switch, an ignition controller which in its "off" position restrains the starter switch closing means, said means preventing movement of the ignition controller to "on" position, a manually operable device for releasing said means from the action of the controller, and fluid pressure means energized by the engine when running under its own power for opening said controlling switch.

11. In an engine starting and ignition system, a starter motor, a starter switch, means tending to close the starter switch, an ignition controller, an interlocking device between said means and said controller, whereby each prevents the action of the other, and a manually operated member for releasing said interlocking device.

12. In an engine starting and ignition system, a starter motor, a starter switch, means tending to close the starter switch, an ignition controller, an interlocking device between said means and said controller, whereby each prevents the action of the other, a manually operated member for releasing said interlocking device, and a fluid pressure operated device controlled by operation of the engine for assuming control of the starter switch after said interlocking device is released.

13. In combination with an internal combustion engine, a starting motor therefor, a starting switch for controlling the motor, an ignition switch for controlling the engine, said starting switch being biased to its switch closed position, and means for preventing movement of said starting switch to its biased position when the ignition switch is open and for permitting such movement when the ignition switch is closed.

14. In a motor starting system, a starting motor circuit, a switch having contacts in said circuit, spring means urging the switch to closed position, electromagnetic means energized by the starter current for holding said contacts closed, and means for neutralizing the action of said spring.

15. In a motor starting system, a starting motor circuit, a switch in said circuit, said switch having contacts, closing means tending to close said switch, electromagnetic means energized by closing of the switch for holding said switch contacts closed, and fluid pressure means energized by running of the engine under its own power for overcoming the action of said closing means.

16. In combination, an ignition switch, a foot pedal for operation of an internal combustion engine driven vehicle, a starting motor circuit having a switch, a spring tending to throw the starting motor switch to closed position, a detent for holding open both the ignition switch and the starting motor switch, and means controlled by said pedal for unlocking said detent to permit both switches to be closed.

17. In combination in a motor driven vehicle, a pedal, a starting motor circuit including a switch having contacts, a spring tending to close said switch contacts, electromagnetic means controlled by the current in said circuit for holding said contacts in engagement, means for restraining the spring from closing the switch, and means operated by said pedal for disabling said restraining means.

18. A starter system for automatically restarting an internal combustion engine comprising a starting motor circuit having switch contacts which invariably break or complete the circuit for operation of the starting motor, automatic means tending at all times to close said contacts, and a fluid pressure operated member actuated by difference of pressure generated by the engine in normal operation for opening the switch, and electromagnetic means energized by the current flow in the starting circuit for holding said contacts closed.

19. A starter system for automatically restarting an internal combustion engine comprising a starting motor circuit having switch contacts which invariably break or complete the circuit for operation of the starting motor, automatic means tending at all times to close said contacts, and a fluid pressure operated member actuated by difference of pressure generated by the engine in normal operation for opening the switch, an ignition circuit, an ignition key therefor, and means controlled by said key locking said starter switch contacts in open position.

20. In an automatic starter system for restarting an internal combustion engine, a starting motor circuit, a switch in said circuit having contacts for breaking or establishing a flow of current in said circuits, means for closing said contacts, electromagnetic means for holding the contacts closed, said means being energized by starting current and becoming inactive upon starting of the engine, a fluid pressure operated member energized by difference of fluid pressure generated by the self-operation of the engine for opening the switch and holding it open, and manually controlled means movable into one position for causing locking of said contacts in open position.

21. In an automatic starter system for restarting an internal combustion engine, a starting motor circuit, a switch in said circuit having contacts for breaking or establishing a flow of current in said circuit, means for closing said contacts, electromagnetic means for holding the contacts closed, said means being energized by starting current and becoming inactive upon starting of the engine, a fluid pressure operated member energized by difference of fluid pressure generated by the self-operation of the engine for opening the switch and holding it open, and manually controlled means movable into one position for causing locking of said contacts in open position, and an ignition circuit which is interrupted by said movement of said manually controlled means into position for causing locking of said contacts in open position.

22. In an engine starting system, a starter circuit for a starting motor, a switch having contacts in said circuit, time delayed means for closing said switch to operate the motor, and electromagnetic means energized by the current in said motor circuit for holding said contacts closed while the motor is drawing starting current.

23. In an engine starting system, a starter circuit for a starter motor, a switch having contacts in said circuit, a relatively weak spring tending to close said contacts, a dash-pot for delaying the action of said spring, and a magnet in series relation to the starter motor for holding the contacts firmly closed.

24. In combination, a starting circuit for a motor for starting an internal combustion engine, a switch biased to closing position for completing the starting circuit, restraining means for said switch, a fluid pressure motor energized by operation of the engine for opening said switch, an ignition circuit, a switch in said ignition circuit, and manually operable means for causing release of said restraining means and closing of both of said switches.

25. In combination, a starting circuit for a motor for starting an internal combustion engine, a switch biased to closing position for closing the starter circuit, a fluid pressure motor energized by operation of the engine for causing opening of said switch, an ignition circuit for the engine, a switch for said ignition circuit biased to closed position, restraining means for both of said switches, and manually operable means for causing said restraining means to be disabled.

BURTON S. AIKMAN.